PHASE ERROR CORRECTION CIRCUIT

Filed March 23, 1962

INVENTOR.
Newman McGee,
BY
H. H. Losche
Attys.

United States Patent Office 3,166,691

Patented Jan. 19, 1965

3,166,691

PHASE ERROR CORRECTION CIRCUIT

Newman McGee, Indianapolis, Ind., assignor to the United States of America as represented by the Secretary of the Navy Filed Mar. 23, 1962, Ser. No. 182,147
2 Claims. (Cl. 317—148.5)
(Granted under Title 35, U.S. Code (1952), sec. 266)

Figure 1:
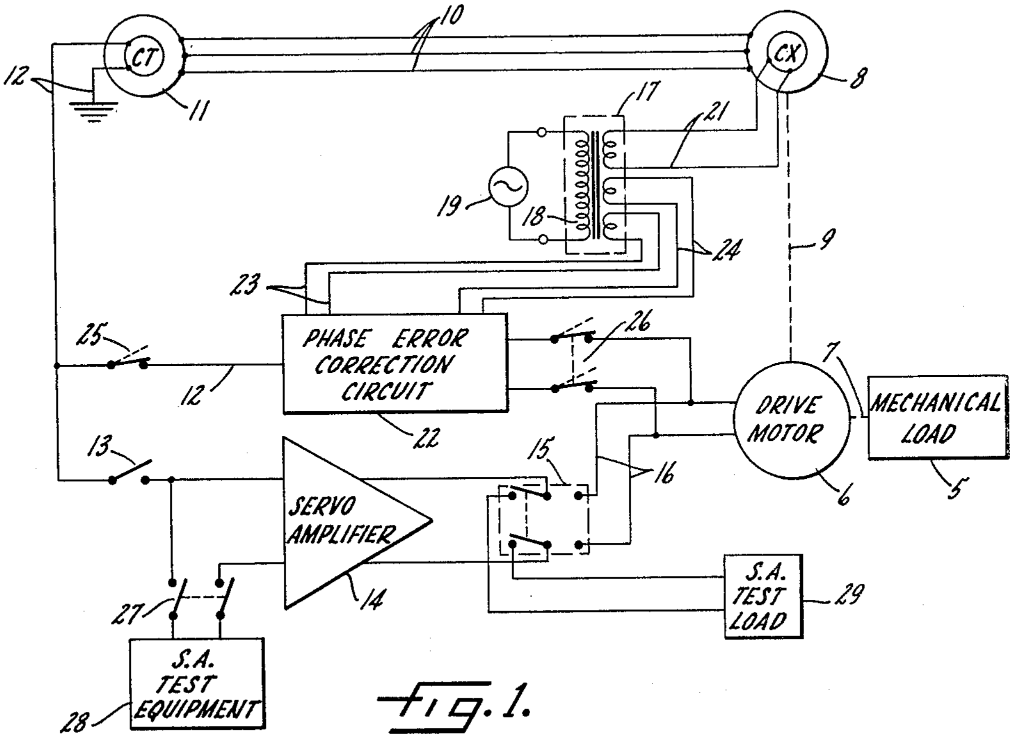

The invention described herein may be manufactured and used by or for the Government of the United States of America for governmental purposes without the payment of any royalties thereon or therefor.

The present invention relates generally to control circuitry utilizing electromagnetic devices and more particularly to substitution circuitry for closed loop synchro-servo control systems to enable electrical removal of servoamplifiers therein for testing and fault determination while still maintaining a closed loop system.

Those engaged in the field of servo circuitry design are well aware of the need to maintain most closed loop servo systems "closed" at all times to prevent destruction of equipment such as radar antennas, aerial cameras, etc., which are controlled by these systems and mechanically coupled thereto. If these loops should become "open" for any significant length of time this equipment would in most cases be mechanically free to oscillate or bounce from side to side due to shifting of its own weight, wind, or other external forces, resulting in damage or destruction of the equipment. Any mechanical damping which could be initially included in the equipment to prevent such oscillation would necessarily hamper its rapid response to correction signals during normal operation of the closed loop system. Thus it becomes apparent that such servo-synchro systems must be maintained closed at all times to prevent possible equipment damage.

A problem arises when some component of the closed loop system, such as a servoamplifier is suspected of possible malfunctioning and it is desired to remove the amplifier from the closed loop circuit for extensive testing and possible repair. This has been accomplished in the past by placing an identical, properly functioning amplifier in parallel with the one to be tested and then removing the latter from the closed loop circuit. Although satisfactory from the standpoint of continued functioning of the closed loop system, this solution is undesirable because it requires duplication of the expensive and bulky servoamplifier.

A second and more satisfactory solution in accordance with the present invention is to provide a relatively inexpensive phase sensitive circuit to substitute for the servoamplifier while it is being tested and/or repaired. The circuitry of this invention contains less components, requires very little space, and is considerably less expensive than a servoamplifier, thus justifying its inclusion as part of the complete servo system, for utilization when necessary to temporarily replace a servoamplifier while it undergoes testing and repair.

An object of the present invention is the provision of a phase sensitive error correction circuit having utility in electrical equipment.

Another object is to provide phase sensitive circuitry for use in closed loop synchro-servo control systems.

A further object of the invention is the provision of substitution circuitry for temporarily replacing a servo-amplifier circuit in a closed loop control system to enable continued functioning of that system.

Still another object is to provide substitution circuitry having less component parts and occupying considerably less space than the servoamplifier circuit which it temporarily replaces.

Yet another object of the present invention is the provision of substitution circuitry which is relatively inexpensive compared to the servoamplifier circuit which it temporarily replaces.

Figure 2:
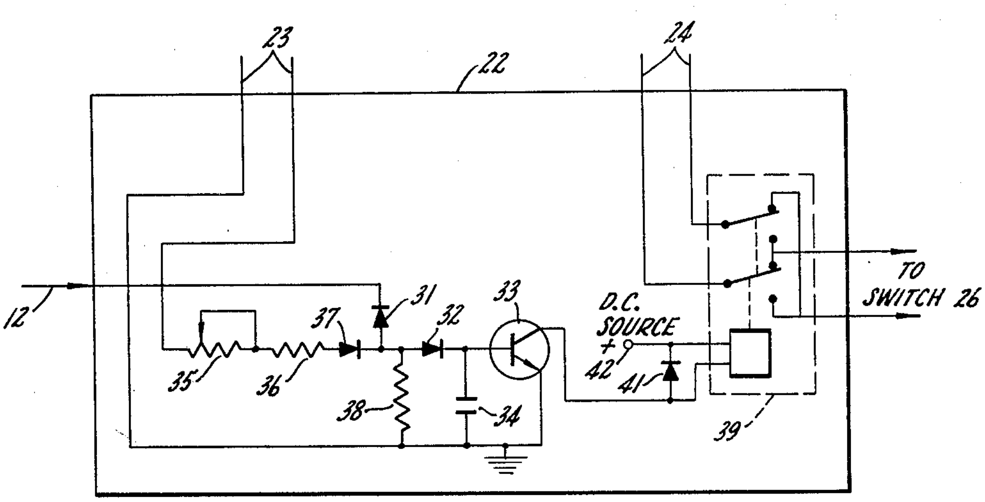

Other objects and features of the invention will become apparent to those skilled in the art as the same becomes better understood by reference to the following detailed description when considered in connection with the accompanying drawing in which like reference numerals designate like parts throughout the figures thereof, and wherein:

FIGURE 1 shows a block diagram of a closed loop servo-synchro control system of the type in which the present invention may be utilized; and FIGURE 2 discloses a schematic diagram of a preferred embodiment of the invention.

Referring now to the drawing there is shown in FIGURE 1 a mechanical load 5 which might be, for example, a radar antenna gimbal or other device to be mechanically positioned by a drive motor 6 through a mechanical coupling 7. A synchromechanism control transmitter (CX)8 has its rotor shaft 9 coupled to drive motor 6 and load 5 in such manner that any physical change of position of load 5 is immediately conveyed via rotor shaft 9 to control transmitter 8 resulting in a change in the magnetic field thereof. This change in the resultant magnetic field of CX8 produces a change in its stator voltages which is conveyed via conductors 10 to the stator windings of a locked-rotor synchromechanism control transformer (CT)11 causing a change in magnitude and/or phase of the rotor voltage of CT11. This rotor voltage is applied via conductors 12 and normally closed switch 13 to a servoamplifier 14, which utilizes this rotor, or error, voltage to produce a correction voltage which is supplied via switch 15 and conductors 16 to drive motor 6 causing it to return mechanical load 5 to its desired initial position. Thus a closed loop servosystem is formed which functions to maintain mechanical load 5 in a particular position, for example, to maintain a radar antenna in a boresight position. Transformer 17 has a primary winding 18 with its terminals coupled across a source of alternating current voltage 19 and a first secondary winding 21 for providing an A.C. exciting voltage to the rotor of CX8. This closed cycle servosystem provides an environment for, but is not considered to be a part of, the present invention which is represented by block 22 of FIGURE 1 and is shown in detail in FIGURE 2. Secondary windings 23 and 24 of transformer 17 provide A.C. potential to the invention, phase error correction circuit 22, and switches 25 and 26 enable circuit 22 to be electrically placed in the closed cycle system when desirable. Switch 27 permits servoamplifier test equipment 28, which may be any type of test equipment utilized in testing and/or servicing servoamplifier circuitry, to be coupled to servoamplifier 14 when it is electrically removed from the closed cycle system for repair, and switch 15 enables a test load 29 to be placed across servoamplifier 14 for use during such testing and/or repair operations.

In FIGURE 2 a preferred embodiment of the invention is shown schematically in which conductor 12 is coupled via diodes 31 and 32 to the base electrode of transistor 33 and a capacitance 34 is coupled across the base and emitter electrodes thereof. One of conductors 23 is coupled via a potentiometer 35, a resistance 36, and a diode 37 to a common junction of diodes 31 and 32; and a resistance 38 has one terminal coupled to the common junction of diodes 31, 32, and 37 and the other coupled to the remaining conductor 23 which is further coupled to the emitter of transistor 33. Conductors 24 are coupled to the input contacts of a double-pole-double-throw phase reversing relay 39 which has its energizing coil coupled, in parallel with a protecting diode 41, between a source of positive direct current potential 42 and the collector of transistor 33; the output contacts of relay 39 are coupled to switch 26 (see FIGURE 1).

In regard to FIGURE 1, so long as all components of this closed cycle servosystem are functioning properly the present invention (block 22 of FIGURE 1) is not utilized in the system and switches 25, 26, and 27 would be in an open position, switch 13 would be closed, and switch 15 would be positioned so as to place servoamplifier 14 across drive motor 6; however, when it is determined that the servosystem is not functioning properly, due to failure of some unknown component therein, switches 25 and 26 would be placed in a closed position as shown (momentarily coupling phase error correction circuit 22 in parallel with servoamplifier 14 in order to protect the closed cycle system from becoming "open"); switches 13 and 15 would then be opened to remove servoamplifier 14 from the system. If the system then functions properly again, the fault can reasonably be expected to lie in servoamplifier 14 which because of its relatively large number of component parts is more susceptible to failure than the balance of the closed cycle system. If placing phase error correction circuit 22 in the system in place of servoamplifier 14 does correct the improper functioning of the system, switches 13 and 15 would remain in an open position in order to electrically remove servoamplifier 14 from the closed cycle system for further testing and necessary repair, leaving the invention, circuit 22, to provide correction voltage to drive motor 6 during the period necessary for repair of amplifier 14. Servoamplifier test equipment 28 and servoamplifier test load 29, together with their respective switching means 27 and 15 are shown merely to indicate that amplifier 14 may be electrically removed from the closed cycle system and coupled to appropriate test equipment for servicing, and form no part of the invention.

Circuit 22 is not, and should not be considered as, a permanent replacement for amplifier 14 because, by construction, it supplies to motor 6 a voltage of constant magnitude which may be reversed in phase in accordance with the error voltage supplied from control transformer 11; therefore so long as circuit 22 is present in the closed cycle system, motor 6 is constantly being driven in one direction and then the other causing a slight oscillation about the desired exact position, whereas servoamplifier 14 when properly functioning in the system supplies voltage of the proper magnitude and phase to motor 6 to cause it to return to the desired position at which time the output voltage of servoamplifier 14 then drops to zero and remains at zero allowing motor 6 to remain at rest until a subsequent change of position of load 5 causes an error voltage to again be presented to amplifier 14 via conductor 12 from control transformer 11.

Having considered in FIGURE 1 an environment in which the invention may be utilized, the operation of the invention itself will now be considered with respect to FIGURE 2. It is assumed that an error signal voltage of the type which would be supplied from the rotor winding of a locked rotor control transformer such as 11 in FIGURE 1 is present on conductor 12, an alternating current reference potential of relatively constant amplitude and phase is applied to conductors 23, and an alternating current motor driving potential of relatively constant amplitude and phase is applied to conductors 24, and thereby to the input contacts of phase reversing relay 39. It is apparent from FIGURE 2 that the voltage across the output conductors of relay 39 will be equal in amplitude to, and either in phase or 180° out of phase with, the A.C. motor driving potential applied to input conductors 24. Thus when the coil of normally open relay 39 is not energized, the A.C. potential present on conductors 24 will be presented to the output conductors of relay 39 having a phase such that it may be utilized to drive a motor of the type shown as element 6 in FIGURE 1 in a first direction; and when the coil is energized the phase of this A.C. potential is reversed in order to drive such motor in the opposite direction. Therefore, it can be seen that by energizing and de-energizing the coil of relay 39, a drive motor coupled to its output conductors will be driven first, in one direction, then in the other. The balance of circuitry in FIGURE 2 (i.e., all circuitry other than relay 39) has for its purpose, then, the energization and de-energization of the coil of relay 39 in such manner as to cause a control motor 6 to maintain its mechanical load 5 as close as possible to a desired position. This is accomplished by a novel combination of diodes with a control transistor wherein the reference voltage applied to conductors 23 is rectified by diode 37 which blocks all negative half cycles thereof and the control voltage from control transformer 11 (which indicates the amount and direction of error in the position of mechanical load 5) present on conductors 12 is rectified by diode 31 which blocks all positive half cycles thereof. When these two voltages are in phase with one another, the negative half cycles of error control voltage from conductors 12 do not affect the amplitude of the positive half cycles of reference voltage from conductors 23 since they are separated in phase from one another by 180°; thus the positive half cycles of the reference voltage are passed by diodes 37 and 32 to the base of transistor 33 causing it to conduct, allowing a direct current to flow from source 42 through the coil of relay 39 to the collector of transistor 33 and therethrough to ground energizing relay 39, which reverses the phase of the voltage applied to motor 6 causing it to reverse direction to return load 5 to the desired position. At the instant when load 5 passes through its desired location the error voltage on conductors 12 from CT11 reverses in phase by 180°. This phase reversal of the error control voltage results in a negative half cycle of that voltage being present at the common junction of diodes 31 and 37 at the same time that a positive half cycle of reference voltage arrives there via diode 37 resulting in a decrease of the positive bias to transistor 33. As load 5 continues to be driven away from the desired position, the amplitude of the error control voltage increases, thereby continuing to decrease the positive bias on transistor 33. When the amplitude of the error voltage becomes equal to that of the reference voltage (this point can be adjusted by potentiometer 35), the two voltages cancel each other causing the positive bias on transistor 33 to drop to zero whereupon it ceases conduction which de-energizes relay 39 reversing the phase of the voltage applied to motor 6 causing it to reverse direction and again return load 5 to the desired position. This reversing action is constantly repeated and load 5 thus ocsillates about the desired position. The amount of oscillation is controlled by potentiometer 35 so that it may be made very small, thus for all practical purposes load 5 can be said to be maintained at the desired position even though a slight oscillation is inherently present in the system.

Thus it can be seen that the present invention, a phase error correction circuit, performs an important and useful function as a very compact and economical, temporary replacement for a much more expensive and bulky servoamplifier while the latter is removed from the closed cycle servosystem for repair or replacement. Obviously many modifications and variations of the present invention are possible in the light of the above teachings. It is therefore to be understood, that within the scope of the appended claims, the invention may be practiced otherwise than as specifically claimed.

I claim:

1. A phase sensitive control circuit comprising:

an electrical relay phase reversing switch means having input means for receiving an alternating current driving potential, output means for supplying said alternating current driving potential with the same and reversed phase to a load, and control coil means for receiving an energizing current to enable said phase reversing switch means to reverse the phase of said alternating current driving potential to said load from that supplied to said input means;

an electronic conduction controlling means having an emitting electrode, a control electrode, and a collecting electrode, said collecting electrode being coupled through said control coil means to a source of direct current potential;

a pair of input terminals for receiving an alternating current reference voltage, one of said terminals being coupled to said emitting electrode;

an input means for receiving an alternating current error voltage;

first and second diode means coupled in series with each other, the remaining end terminal of said second diode means being coupled to said control electrode of said conduction controlling means;

a potentiometer means for adjusting the amplitude of said alternating current reference voltage, said potentiometer means being coupled between the other of said pair of input terminals and the remaining end of said first diode means; and a third diode means having one terminal thereof coupled to said input means for receiving an alternating current error voltage and having the other terminal coupled to the common junction of said first and second diode means, and being polarized in a direction opposite to that of said first diode means with respect to said control electrode of said conduction controlling means.

2. In a closed cycle servosystem, a phase sensitive control circuit for temporary replacement of a more complex servoamplifier to permit testing and repair thereof comprising:

an electrical relay phase reversing switch means having input means for receiving an alternating current driving potential, having output means for supplying said alternating current driving potential, with the same phase and with reversed phase, to a load and having control coil means for receiving an energizing current to enable said phase reversing switch means to reverse the phase of said alternating current driving potential between said input means and said output means;

a transistor means having emitter, base and collector electrodes, said collector electrode being coupled via said control coil means of said phase reversing switch means to a source of direct current potential;

a diode protection means coupled across the terminals of said control coil means of said phase reversing switch means;

first and second diode means coupled in series with each other, the remaining end terminal of said second diode means being coupled to said base electrode of said transistor means;

first and second input terminals for receiving an alternating current reference voltage, said second input terminal being coupled in common with said emitter electrode of said transistor means to ground potential;

a potentiometer means for adjusting the amplitude of said alternating current reference voltage, said potentiometer means being coupled between said first input terminal and the remaining end terminal of said first diode means;

input means for receiving an alternating current error voltage; and a third diode means having one terminal thereof coupled to said input means for receiving an alternating current error voltage and having the other terminal coupled to the common junction of said first and second diode means, and being polarized in a direction opposite to that of said first diode means with respect to said base electrode of said transistor means.

References Cited by the Examiner

UNITED STATES PATENTS

| | | | |
|---|---|---|---|
| 2,886,755 | 5/59 | Ehret et al. | |
| 2,907,932 | 10/59 | Patchell | 317—148.5 |
| 3,035,215 | 5/62 | De Viney | 317—148.5 X |
| 3,042,872 | 7/62 | Brahm. | |
| 3,065,427 | 11/62 | Birdwell. | |
| 3,103,633 | 9/63 | Hartog. | |

SAMUEL BERNSTEIN, *Primary Examiner.*

LLOYD McCOLLUM, *Examiner.*